(12) United States Patent
Schrader

(10) Patent No.: US 7,536,744 B1
(45) Date of Patent: May 26, 2009

(54) WIPER SYSTEM WITH ROTATING WIPER LIFTER AND METHOD OF MAKING SUCH SYSTEM

(75) Inventor: Michael Schrader, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/954,441

(22) Filed: Dec. 12, 2007

(51) Int. Cl.
  *B60S 1/38* (2006.01)
  *B60S 1/32* (2006.01)
  *B60S 1/04* (2006.01)

(52) U.S. Cl. .............................. 15/250.19; 15/250.001; 15/250.16; 29/428

(58) Field of Classification Search .............. 15/250.19, 15/250.16, 250.351, 250.44, 250.001, 250.361; 29/428
See application file for complete search history.

(56) References Cited

U.S. PATENT DOCUMENTS

| | | | |
|---|---|---|---|
| 4,040,141 A * | 8/1977 | O'Steen | 15/250.19 |
| 4,969,228 A * | 11/1990 | Edwards et al. | 15/250.19 |
| 5,035,023 A | 7/1991 | Slingerland, Jr. | |
| 5,101,531 A * | 4/1992 | Edwards et al. | 15/250.19 |
| 5,415,453 A | 5/1995 | Huber | |
| 5,504,966 A | 4/1996 | Lee et al. | |
| 5,628,084 A | 5/1997 | Chen | |
| 5,675,861 A | 10/1997 | Ayers | |
| 6,253,409 B1 | 7/2001 | Terai | |
| 6,622,338 B1 | 9/2003 | Chen et al. | |
| 6,675,430 B2 | 1/2004 | Hamamoto | |
| 6,802,101 B2 | 10/2004 | Egner-Walter | |

FOREIGN PATENT DOCUMENTS

JP   58-63551   *  4/1983
JP   59-179437  * 10/1984

* cited by examiner

*Primary Examiner*—Gary K Graham
(74) *Attorney, Agent, or Firm*—Mark E. Duell, Esq.; Emerson, Thomson & Bennett, LLC.

(57) ABSTRACT

The present invention relates to a wiper system for a window of a motor vehicle. A wiper assembly is provided that oscillates over the window to remove moisture. A slider member extends outwardly and generally away from the wiper assembly. A pivotal lifter is affixed to the motor vehicle and engages the slider member to pivotally lift the wiper assembly away from the window upon deactivation of the wiper system. The present invention also relates to a corresponding method of making a wiper system in accordance with the above description.

12 Claims, 6 Drawing Sheets

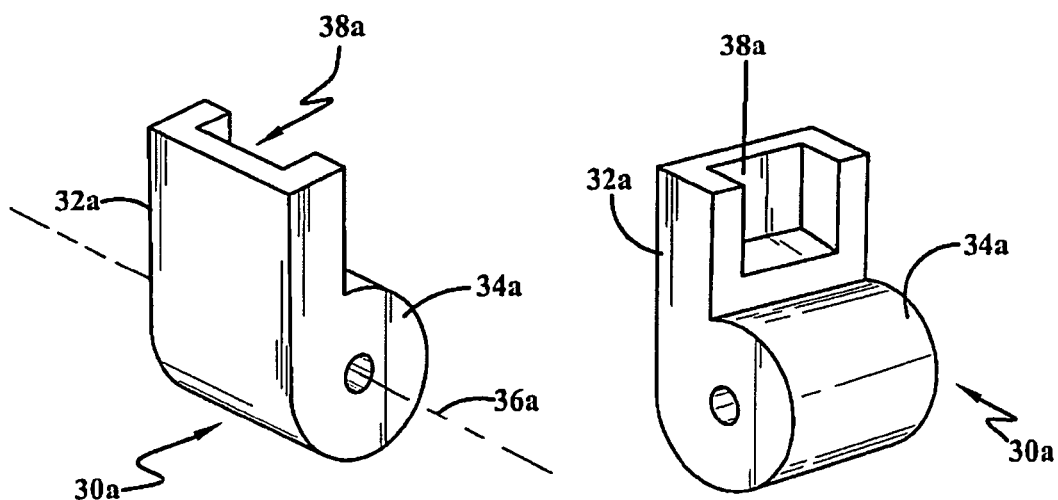
FIG. 6A  FIG. 6B
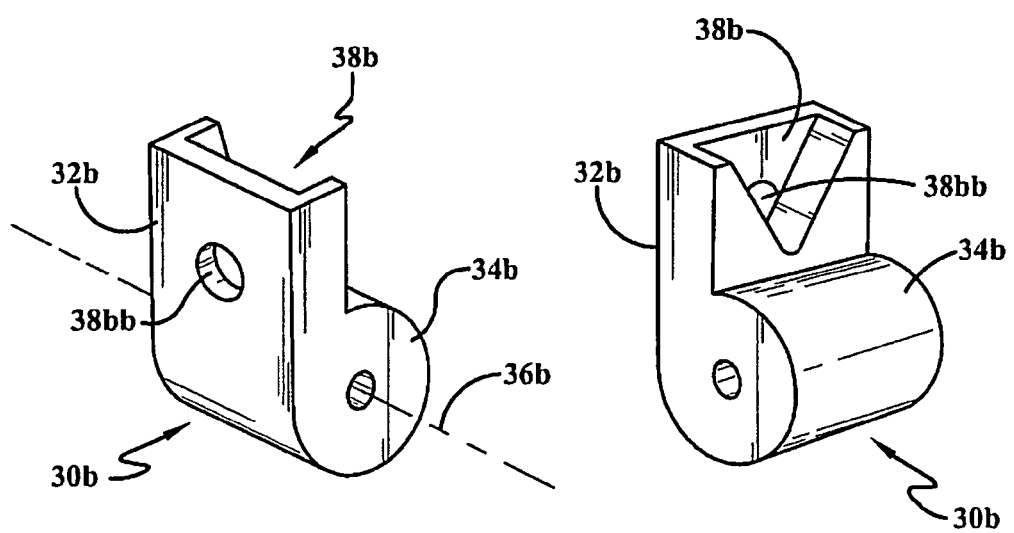
FIG. 7A  FIG. 7B

US 7,536,744 B1

WIPER SYSTEM WITH ROTATING WIPER LIFTER AND METHOD OF MAKING SUCH SYSTEM

I. BACKGROUND OF THE INVENTION

A. Field of Invention

This invention generally relates to the field of lifters for wiper systems that oscillate back and forth across a window of a motor vehicle to remove moisture.

B. Description of the Related Art

The present invention provides a wiper system that overcomes the problems associated with previous type lifter systems that lift a wiper away from a vehicle window but allow the wiper to dangle unconstrained, resulting in rattle and potential damage to the paint of the vehicle. Some previous type lifter systems are large and make an undesirable "thud" noise upon parking the wiper onto the lifter system.

II. SUMMARY OF THE INVENTION

Some embodiments of the present invention relate to a wiper system for a window of a motor vehicle. A wiper assembly is provided that oscillates over the window to remove moisture. A slider member extends outwardly and generally away from the wiper assembly. A pivotal lifter is affixed to the motor vehicle and engages the slider member to pivotally lift the wiper assembly away from the window upon deactivation of the wiper system.

Other embodiments of the present invention relate to a method of making a wiper system for a window of a motor vehicle. A wiper assembly is provided for oscillation over the window to remove moisture. A slider member is attached to the wiper assembly so that the slider member is disposed outwardly and generally away from the wiper assembly. A pivotal lifter is affixed to the motor vehicle so as to engage the slider member upon deactivation of the wiper system, to pivotally lift the wiper assembly away from the window.

Still other embodiments of the invention relate to a wiper system for a window of a motor vehicle including means for wiping over the window to remove moisture and means for pivotally lifting the means for wiping away from the window upon deactivation of the wiper system. Slider means are provided, affixed to the means for wiping, for engaging the means for pivotally lifting.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIGS. 6A and 6B are respective front perspective and rear perspective views of a pivotal lifter, in accordance with an exemplary embodiment of the present invention.

FIGS. 7A and 7B are respective front perspective and rear perspective views of a pivotal lifter, in accordance with an alternative embodiment of the present invention.

IV. DETAILED DESCRIPTION OF THE INVENTION

The present invention generally relates to window wiping systems for motor vehicles and methods for making the same. In particular, the present invention has specific applicability to wiper systems for rear windows of motor vehicles.

Figure 1:
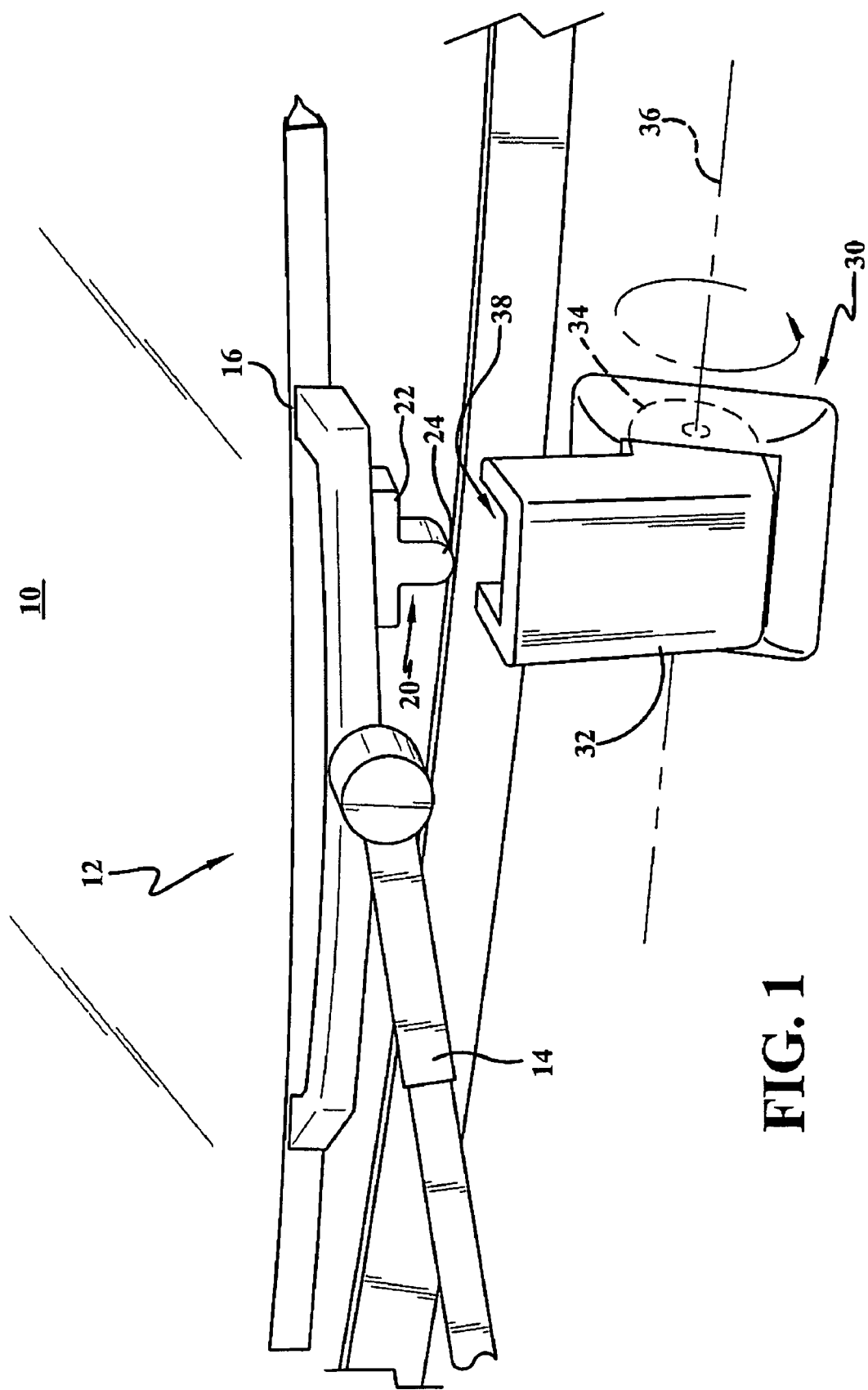
FIG. 1 is a perspective view of a wiper system in accordance with the present invention.

Reference is now made to the drawings wherein the showings are for purposes of illustrating embodiments of the invention only and not for purposes of limiting the same, and where it is to be understood that like reference numerals to refer to like components. FIG. 1 is a perspective view of a wiper system for a window 10 of a motor vehicle, preferably a rear window. A wiper assembly 12 is generally a structure that oscillates over the window 10 to remove moisture, such as rain, mist, snow, and the like as typically accompany a variety of environmental conditions encountered during various seasons and climates. The wiper assembly 12 includes a wiper arm 14 that supports a wiper blade 16 and is coupled to a pivot member 18 (FIGS. 2A and 2B) for oscillating the wiper arm 14 and blade 16 back and forth across the window 10 in a reciprocal motion.

A slider member 20 is provided that extends outwardly and generally away from the wiper assembly 12. The slider member 20 is preferably affixed to the wiper blade 16 in order to secure the wiper blade 16 against unconstrained motion that could result in rattle and potential damage to the vehicle paint. However, the slider member 20 could also be affixed to the wiper arm 14 without departing from the present invention.

As shown particularly in FIG. 1, the slider member 20 generally has a "T" shape, and includes a mounting surface portion 22 for substantially abutting the wiper blade 16. The slider member 20 is preferably formed integrally with the wiper blade 16 in an initial manufacturing process or as part of an aftermarket design. However, in an alternate embodiment, a discrete slider member 20 be can affixed to the wiper blade 16 along the mounting surface portion 22 using a suitable joining method, such as with an adhesive or with fasteners such as screws, as is known in the art.

The slider member 20 also includes a slider portion 24, preferably comprising a substantially elongated protuberance formed perpendicularly to the mounting surface portion 22, so as to extend outwardly and generally away from the wiper blade. In the preferred embodiment, the slider member 20 is oriented so that the slider portion 24 extends generally perpendicular to the wiper assembly and substantially parallel to the window. This orientation facilitates engagement with the pivotal lifter, as explained in detail hereinbelow.

Figure 2A:
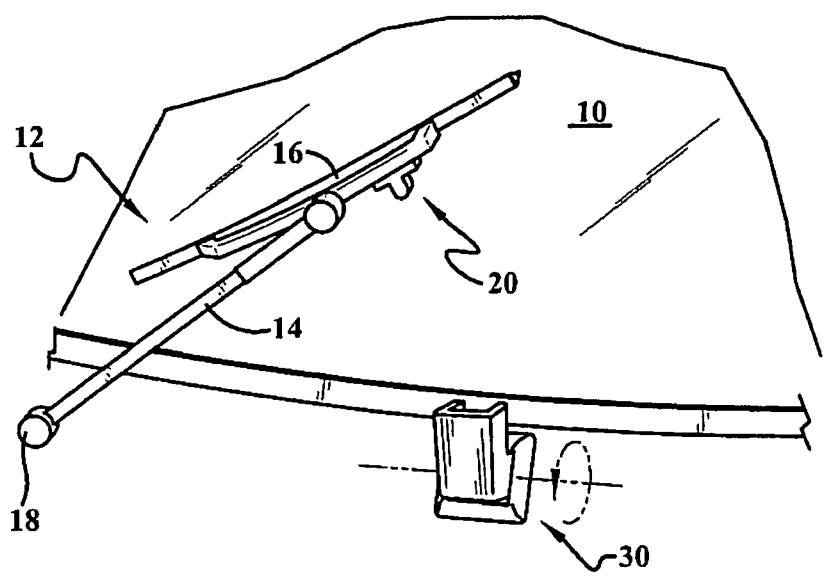
FIGS. 2A and 2B are plan views respectively depicting non-engagement and engagement positions of the wiper assembly having a slider member with a pivotal lifter, in accordance with the present invention.
Figure 2B:
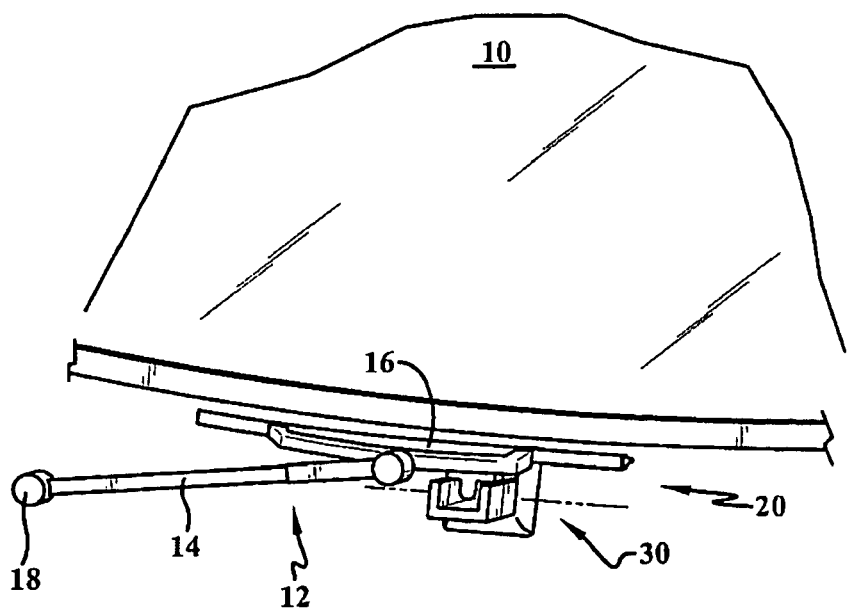

A pivotal lifter 30 is affixed to the motor vehicle and engages the slider member 20 to pivotally lift the wiper assembly 12 away from the window 10 upon deactivation of the wiper system. As shown in FIGS. 2A and 2B, the wiper system is oscillated back and forth by the action of a pivot member 18. Upon deactivation of the wiper system, the wiper assembly 12 is rotationally displaced toward the exterior of the perimeter of the window 10, so as to not obstruct the view through the window 10 when the wiper system is not in use.

FIG. 2A depicts the wiper assembly 12 moving toward its position upon deactivation, with the slider member 20 moving toward engagement with the pivotal lifter 30. FIG. 2B shows the wiper assembly 12 upon deactivation, at a position exterior to the perimeter of the window 10, with the slider member 20 in engagement with the pivotal lifter 30.

The pivotal lifter 30 includes an engagement portion 32 for engaging the slider member and a pivot portion 34 for pivotal motion about a pivot axis 36. In the preferred embodiment, the pivot portion 34 is a substantially cylindrical member with the cylindrical axis corresponding to the pivot axis 36, so as to allow a reciprocating pivotal motion about the pivot axis 36. The engagement portion 32 is a substantially elongated portion extending perpendicularly away from the pivot portion 34, which in operation is configured to extend toward the slider member 20. The engagement portion 32 includes a recessed portion 38 for receiving and engaging the slider member 20, and is preferably sized larger than the slider portion 24 so as to allow a sufficient port of entry.

Figure 3B:
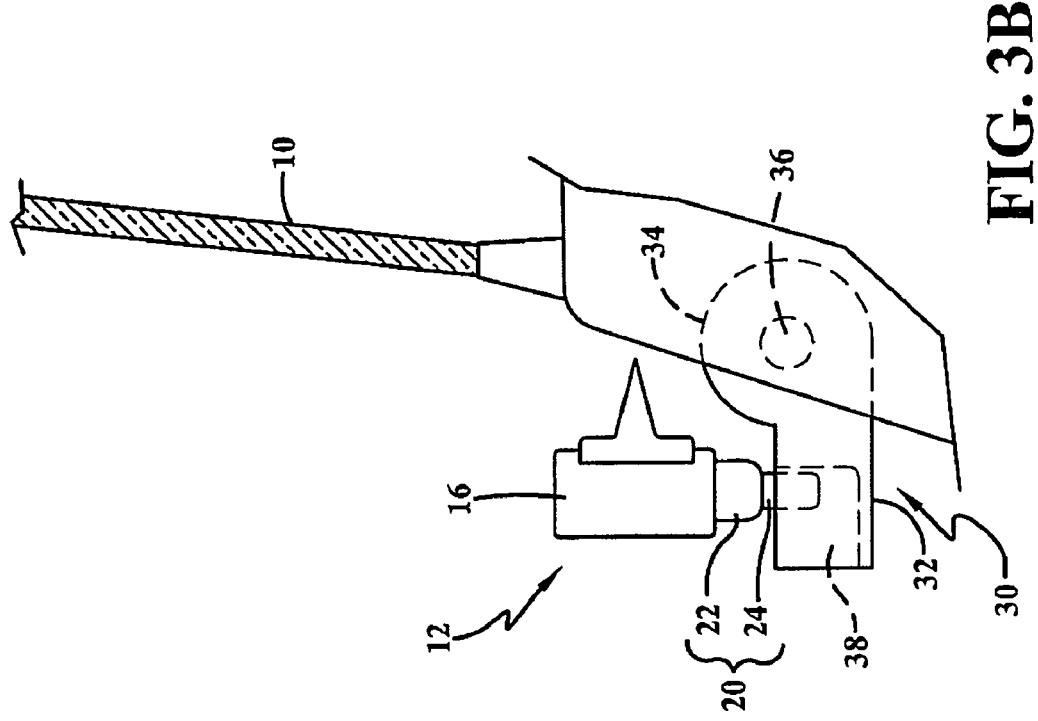
FIGS. 3A and 3B are side-sectional views respectively depicting non-engagement and engagement positions of the wiper assembly having the slider member with a pivotal lifter, in accordance with the present invention.
Figure 3A:
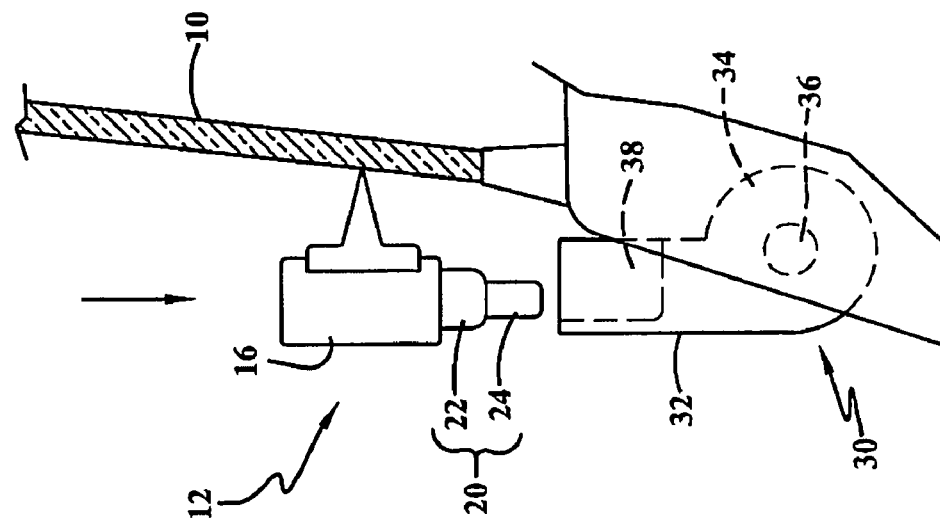

The operation of the present wiper system with the pivotal lifter 30 is illustrated in FIGS. 3A and 3B, which are side-sectional views respectively corresponding to FIGS. 2A and 2B. FIG. 3A generally indicates the wiper system moving toward its position upon deactivation. The wiper blade 16 is in contact with the window 10 and the slider member 20 is approaching the engagement portion 32 of the pivotal lifter such that the slider portion 24 is poised generally proximate to the entrance to the recessed portion 38. The pivotal lifter 30 is at a non-engagement position, i.e. a first angular position where the slider member 20 is not engaged and the engagement portion 32 is substantially proximate to the window.

The pivotal lifter 30 pivots between the first angular position and a second angular position, i.e, an engagement position, as shown in FIG. 3B. At the second angular position the slider member 20 is engaged with the pivotal lifter 30 is such a way that the slider portion 24 is received in the recessed portion 38 and thereby contacts the engagement portion 32. As a result of the downward motion, the pivotal lifter 30 is pivoted to the second angular position so that the engagement portion 32 is laterally displaced from the window. As a result, the pivotal action of the engagement portion 32 laterally displaces the entire wiper assembly 12, thereby removing the wiper blade 16 from contact with the window 10 and holding it firmly against any unconstrained motion.

Figure 4:
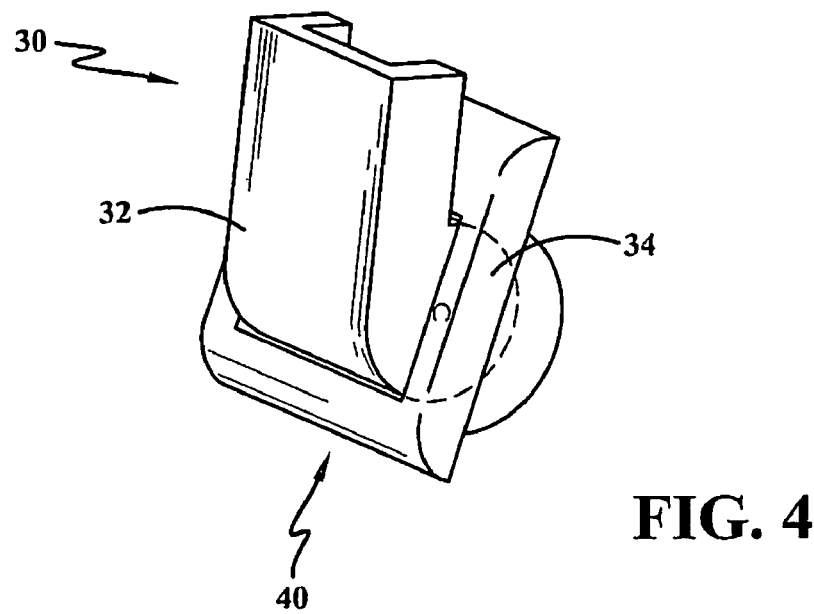
FIG. 4 is a perspective view showing an exemplary pivotal lifter assembly, in accordance with the present invention.
Figure 5:
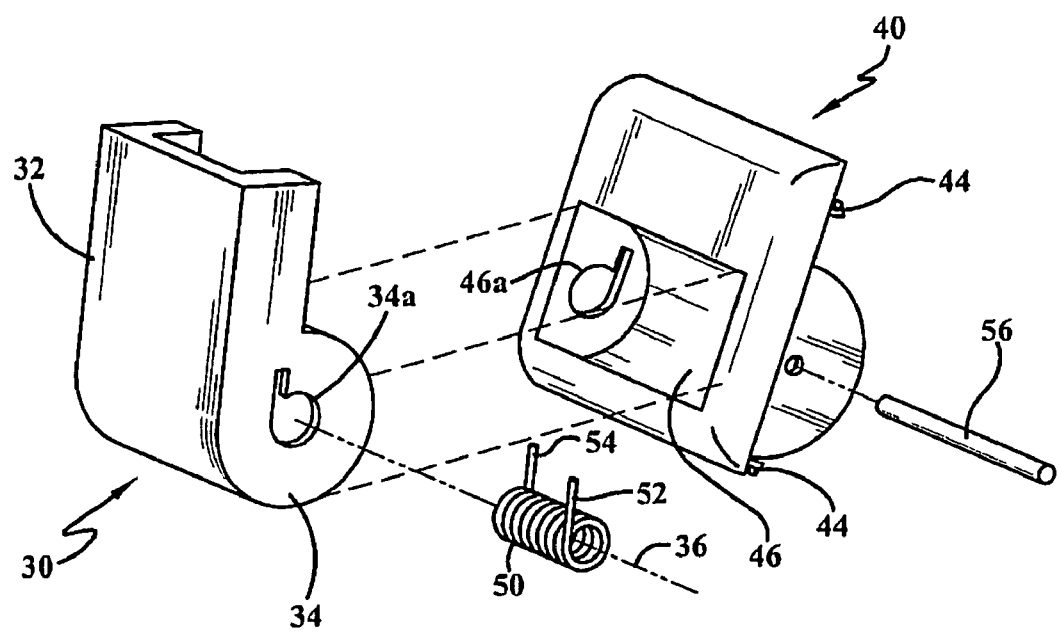
FIG. 5 is an exploded view of the exemplary pivotal lifter assembly of FIG. 4, in accordance with the present invention.

As shown in FIG. 1 and particularly FIGS. 4 and 5, the pivotal lifter 30 includes a receptacle 40 for receiving and movably retaining the pivot member 34. The receptacle 40 is fashioned to mount onto the motor vehicle at a suitable position proximate to the window, and provide a structural support for the pivotal lifter 30.

As depicted in the figures, the receptacle 40 includes a flange portion 42 for providing a mating surface to a vehicle body, preferably to be received within an opening (not shown) formed in the vehicle body. The flange portion 42 includes a plurality of tabs 44 for engaging the edges of the opening. In this way, the receptacle 40 seals out moisture that could enter the interior of the vehicle body through the opening.

The receptacle 40 includes a cavity 46 sized and shaped to receive the pivot member 34. The cavity 46 is preferably cylindrically-shaped so as to allow free pivotal motion of the pivot member 34 with a minimum of sidewall clearance. The pivotal lifter 30 is preferably spring-loaded to as to allow a reciprocal pivotal motion and to automatically restore the pivotal lifter 30 to the non-engagement position when the wiper system 12 is activated.

The pivotal lifter 30 therefore also includes a spring member 50 that pivotally biases the pivotal lifter towards the non-engagement position. In an exemplary embodiment shown in the exploded view of FIG. 5, the spring member 50 is preferably a coil spring received within the pivot member 34 along the pivot axis 36. Of course, it is appreciated that any type of spring arrangement can be implemented without departing from the invention, In the embodiment of FIG. 5, the spring member 50 can be manually inserted inside pivot member 34. Alternatively, the pivot member 34 can be over-molded the spring member 50 in an injection molding process. Indeed, any method known in the art can be optionally be supplied to secure the spring member 50 to the pivotal lifter 30.

In the exemplary embodiment as illustrated, the spring member 50 can include extended ends 52, 54 at either side, protruding upward. These ends 52, 54 can be formed so that one of the ends is affixed to the side of the pivot member 34, for example, received within an opening 34*a*, suitably sized and dimensioned to accommodate the respective end and to provide a resistance surface against which the spring member 50 may be tensioned. The receptacle 40 can include a respective opening 46*a* formed on the inside of the cavity 46, also suitably sized and dimensioned to accommodate the respective end and to provide a resistance surface against which the spring member 50 may be tensioned.

An axle 56 may be driven through the receptacle 40, the spring member 50, and the pivotal lifter 30, so as to rotationally secure the pivot member 34 within the cavity 46. In this manner, the spring member 50 is axially tensioned upon displacement of the pivotal lifter 30, thereby urging the pivotal lifter 30 into the non-engagement position during the operation of the wiper assembly 12.

A first embodiment of the present pivot lifter 30*a* is shown in FIGS. 6A and 6B. An engagement portion 32*a* and a pivot portion 34*a* are provided for pivotal motion about a pivot axis 36*a*, substantially as described in the embodiments hereinabove. The engagement portion 32*a* includes a recessed portion 38*a* having a generally rectangular profile and opened on an interior side of the engagement portion 32*a*. In this way, the engagement portion 32*a* has a consistent U-shaped cross-section along its length for receiving and engaging the slider member 20, which abuts at a substantially flat surface at the bottom of the recessed portion 38*a*. As mentioned hereinabove, the recessed portion 38*a* is preferably sized larger than the slider portion 24 so as to allow a sufficient port of entry, and to accommodate any lateral motion as the slider portion 24 moves into position.

A second embodiment of the present pivot lifter 30*b* is shown in FIGS. 7A and 7B. An engagement portion 32*b* and a pivot portion 34*b* are provided for pivotal motion about a pivot axis 36*b*, substantially as described in the embodiments hereinabove. The engagement portion 32*b* includes a recessed portion 38*b* that has a generally tapered profile and is opened on an interior side of the engagement portion 32*b*. In this way, the recessed portion 38*b* narrows along its length for receiving and engaging the slider member 20, which nests inside a curved pocket at the bottom of the recessed portion 38*b*, thereby providing secure capture of the slider member 20. To provide additional secure capture, the recessed portion 38*b* may also include an aperture 38*bb*, suitably large so that the slider portion 24 can slide therein upon attaining the engagement position. The tapered recessed portion 38*b* receives and directs the slider member 20 into the aperture 38*bb*.

Figure 8:
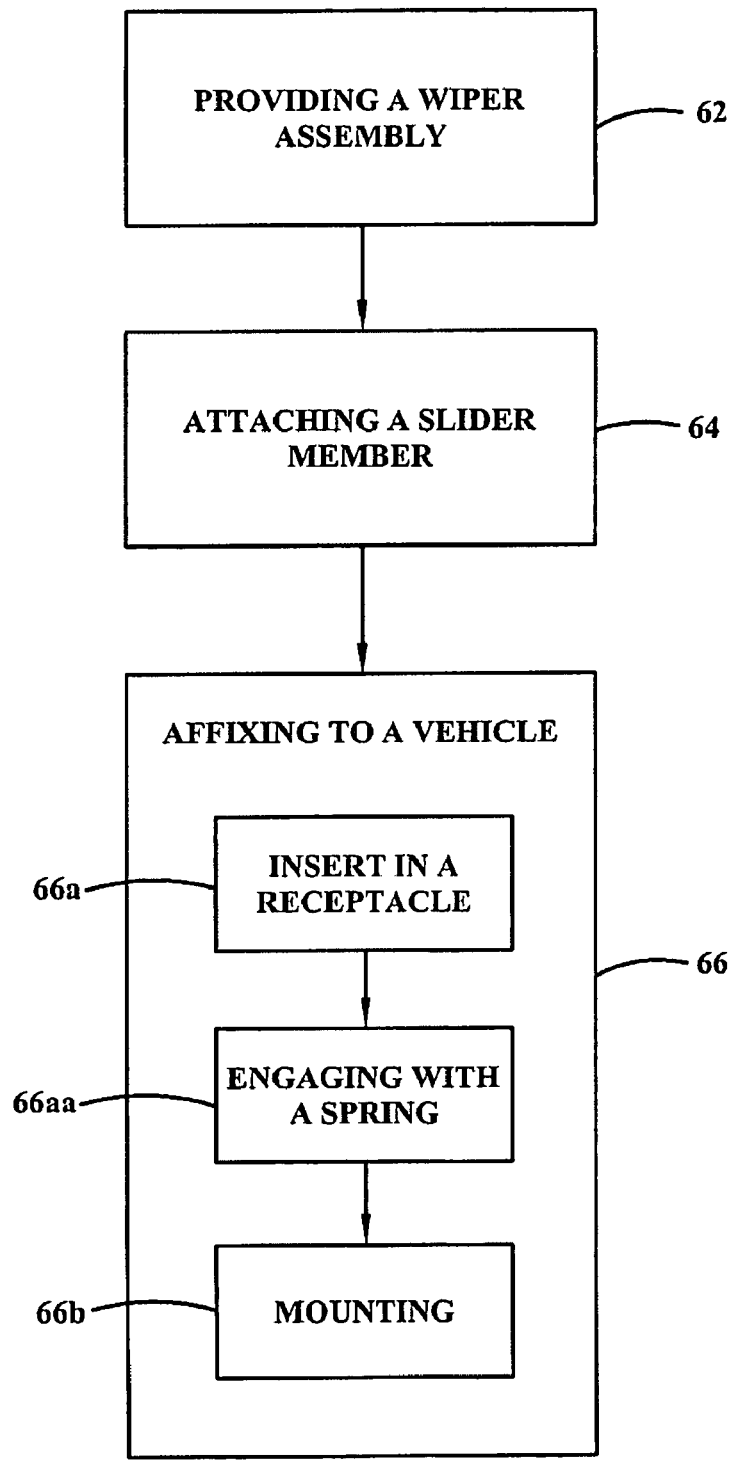
FIG. 8 is a flowchart illustrating a process according to an embodiment of the invention.

FIG. 8 is a flow chart illustrating the steps of a method 60 for making a wiper system for a window of a motor vehicle. A step 62 is performed of providing a wiper assembly for oscillation over the window to remove moisture. This can be performed in a vehicle manufacturing process or as a retrofit to an existing vehicle of a wiper assembly or portion thereof.

A step 64 is performed of attaching a slider member to the wiper assembly so that the slider member is disposed outwardly and generally away from the wiper assembly. This step can include forming the slider member integrally with some portion of the wiper assembly in a manufacturing process. Alternatively, the slider member can be subsequently affixed to the wiper assembly using a suitable joining method, such as with an adhesive or with fasteners such as screws, as is known in the art.

The step 64 of attaching the slider member can be performed so as to be attached to any desired portion of the wiper assembly. In the preferred embodiment, the slider member can be attached to a wiper blade supported by a wiper arm which is coupled to a pivot head for oscillating the wiper blade.

Following the step 64 of attaching, a step 66 is performed of affixing a pivotal lifter to the motor vehicle. The pivotal lifter engages the slider member upon deactivation of the wiper system, to pivotally lift the wiper assembly away from the window. The step 66 of affixing can be performed during an initial manufacturing process, or can be performed after the fact on an existing vehicle. The step of attaching can include securing a pivotal lifter component at a suitable position on an exterior surface of the vehicle. It can also be performed by inserting the pivotal lifter into an opening formed in the vehicle body.

The step 66 of affixing the pivotal lifter to the motor vehicle can include an intermediate step 66*a* of receiving and movably retaining the pivotal lifter within a receptacle, and a subsequent component step 66*b* of mounting the receptacle onto the motor vehicle at a suitable position proximate to the window.

The intermediate step 66*a* of receiving and movably retaining the pivotal lifter within the receptacle can optionally further include an additional intermediate step 66*aa* of engaging the pivotal lifter with a spring member to pivotally bias the pivotal lifter towards a non-engagement position. This can be done by inserting a spring into a pivotal lifter body or else by overmolding the spring with the pivotal lifter in an injection molding process. This step also includes a step of securing the spring against movement, so as to provide a stable resistance against which the pivotal lifter can be biased to a non-engagement position.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

I claim:

1. A wiper system for a window of a motor vehicle, comprising:
   a wiper assembly that oscillates over the window to remove moisture;
   a slider member that extends outwardly and generally away from the wiper assembly; and
   a pivotal lifter, affixed to the motor vehicle, that engages the slider member to pivotally lift the wiper assembly away from the window upon deactivation of the wiper system, wherein the pivotal lifter further comprises an engagement portion for engaging the slider member and a pivot portion for pivotal motion about a pivot axis, wherein the engagement portion comprises a recessed portion for receiving and engaging the slider member, wherein the recessed portion comprises an aperture in the recessed portion, and wherein the recessed portion is substantially tapered to receive and direct the slider member into the aperture.

2. The wiper system of claim 1, wherein the wiper assembly comprising a wiper arm that supports a wiper blade and is coupled to a pivot head for oscillating the wiper blade, wherein the slider member is affixed outwardly and generally away from the wiper blade.

3. The wiper system of claim 1, wherein the slider member extends generally perpendicular to the wiper assembly and substantially parallel to the window.

4. The wiper system of claim 1, wherein the pivotal lifter is adapted to pivot between a first angular position and a second angular position, wherein at the first angular position the slider member is not engaged and the engagement portion is substantially proximate to the window, and wherein at the second angular position the slider member is engaged and the engagement portion is laterally displaced from the window.

5. The wiper system of claim 1, further comprising a receptacle for receiving and movably retaining the pivot portion, the receptacle adapted to mount onto the motor vehicle at a suitable position proximate to the window.

6. The wiper system of claim 1, wherein the pivotal lifter further comprises a spring member that pivotally biases the pivotal lifter towards a non-engagement position.

7. The wiper system of claim 6, wherein the spring member comprises a coil spring received within the pivot portion along a pivot axis.

8. The wiper system of claim 1, wherein the window is a rear window of a motor vehicle.

9. A method of making a wiper system for a window of a motor vehicle, comprising:
   providing a wiper assembly for oscillation over the window to remove moisture;
   attaching a slider member to the wiper assembly so that the slider member is disposed outwardly and generally away from the wiper assembly; and
   affixing a pivotal lifter to the motor vehicle so as to engage the slider member upon deactivation of the wiper system, to pivotally lift the wiper assembly away from the window,
   wherein making the pivotal lifter comprises:
   forming a engagement portion for engaging the slider member and a pivot portion for pivotal motion about a pivot axis, and
   forming a recessed portion in the engagement portion for receiving and engaging the slider member, wherein the recessed portion comprises an aperture, and wherein the recessed portion is substantially tapered to receive and direct the slider member into the aperture.

10. The method of claim 9, wherein attaching the slider member to the wiper assembly comprises attaching the slider member to a wiper blade supported by a wiper arm that is coupled to a pivot head for oscillating the wiper blade.

11. The method of claim 9, wherein affixing the pivotal lifter to the motor vehicle comprises receiving and movably retaining the pivotal lifter within a receptacle, and mounting the receptacle onto the motor vehicle at a suitable position proximate to the window.

12. The method of claim 11, wherein receiving and movably retaining the pivotal lifter within the receptacle comprises engaging the pivotal lifter with a spring member to pivotally bias the pivotal lifter towards a non-engagement position.

* * * * *